United States Patent [19]
Habich

[11] Patent Number: 6,022,035
[45] Date of Patent: Feb. 8, 2000

[54] WHEEL SUSPENSION

[75] Inventor: Heiko Habich, Singen, Germany

[73] Assignee: Alusuisse Technology & Management Ltd., Switzerland

[21] Appl. No.: 08/947,927

[22] Filed: Oct. 9, 1997

[30] Foreign Application Priority Data

Nov. 5, 1996 [EP] European Pat. Off. .............. 96810735

[51] Int. Cl.$^7$ ................................................. B60G 11/46
[52] U.S. Cl. ......................... 280/124.128; 280/124.133; 280/124.116
[58] Field of Search ..................... 280/124.128, 124.133, 280/124.13, 124.11, 124.116, 124.117, 124.121, 124.122

[56] References Cited

U.S. PATENT DOCUMENTS

| | | | |
|---|---|---|---|
| 4,392,667 | 7/1983 | Shakespear | 280/124.128 |
| 4,429,900 | 2/1984 | Feher | 280/124.128 |
| 4,486,030 | 12/1984 | Takata et al. | 280/124.133 |
| 4,537,420 | 8/1985 | Ito et al. | 280/124.133 |
| 4,681,343 | 7/1987 | Gallet et al. | 280/124.128 |
| 4,725,073 | 2/1988 | Sano et al. | 280/124.128 |
| 5,324,073 | 6/1994 | Alatalo | 280/124.116 |

*Primary Examiner*—Christopher P. Ellis
*Attorney, Agent, or Firm*—Bachman & LaPointe, P.C.

[57] ABSTRACT

Wheel suspension for road vehicles, in particular non-power-driven semi-rigid axles for private cars and light commercial vehicles having a crossmember defining an axle, axle carrier or swinging axle link and trailing arms attached at both ends of the crossmember, whereby the trailing arm features an arrangement for attachment to the vehicle and for mounting the wheel. The trailing arms are extruded single or multi-chamber hollow sections, made for example of aluminum or one of its alloys. The trailing arms feature a projection facing the middle of the vehicle. The projections on the trailing arm form a channel-shaped section along with the wall strip of the trailing arm. Attachment structure for attaching the elements for wheel suspension and for the crossmember of the axle or axle carrier or swinging axle link may be mounted on this channel-shaped section.

17 Claims, 2 Drawing Sheets

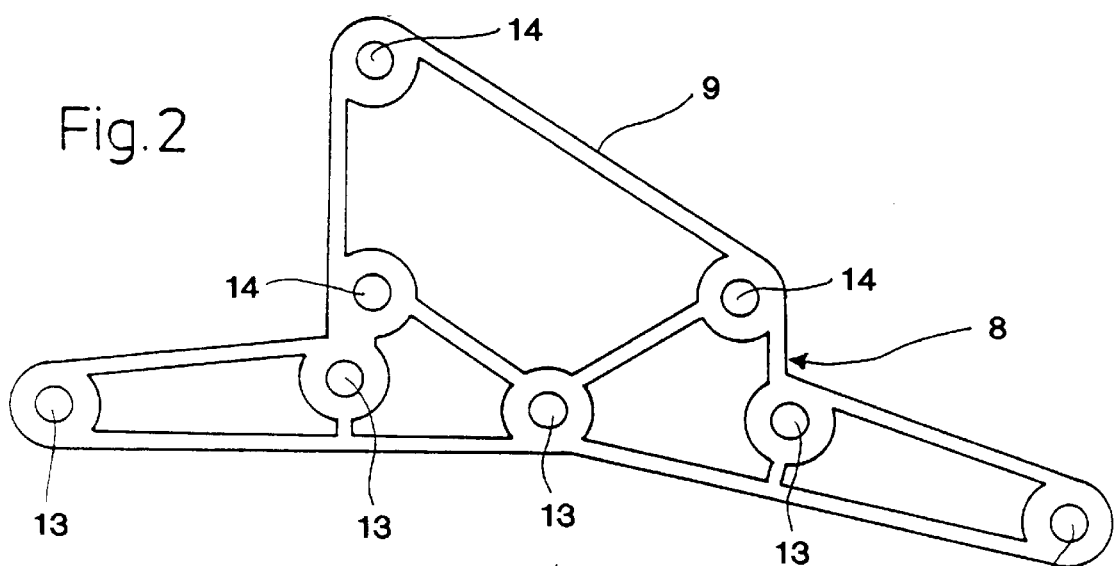
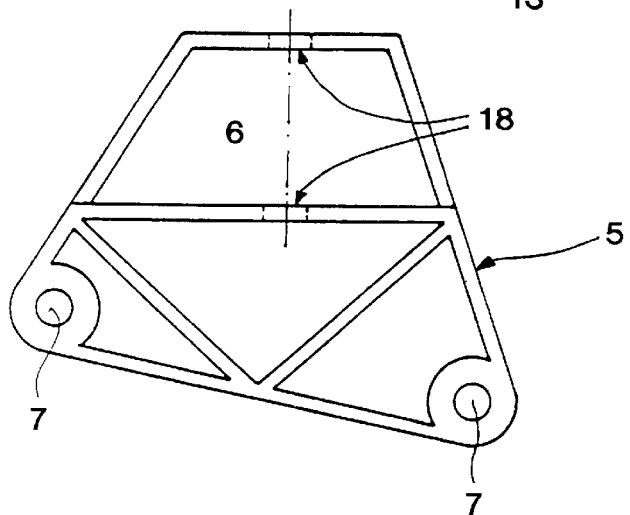
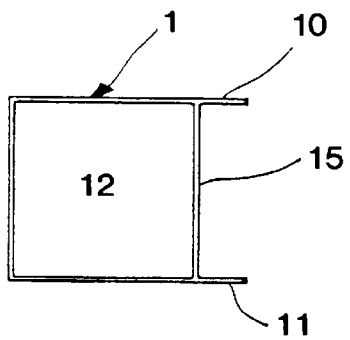
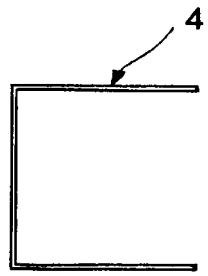

WHEEL SUSPENSION

BACKGROUND OF THE INVENTION

The present invention relates to a wheel suspension for road vehicles, in particular non-power-driven semi-rigid axles for private cars and light commercial vehicles, having a crossmember of the axle, axle carrier or swinging axle link and trailing arms attached at both ends of the crossmember of the axle, axle carrier or swinging axle link, whereby the trailing arm features means for attachment to the vehicle and means for accommodating the wheel According to the type of spring suspension and the form of wheel drive, various types of construction are employed for the wheel suspension on vehicles such as private cars or light commercial vehicles. Among the most widely used wheel suspensions for the rear wheels are rigid and semi-rigid axles. Especially in vehicles with front wheel drive, the rear axle may be simple in design. For that reason the rigid, or more exactly semi-rigid axles, the swinging axle axis, the swinging axle link axis and the torsion link axis have proved themselves best as wheel suspension means in front wheel drive vehicles.

In these types of axle construction the rear wheels are mounted on trailing arms at the rear end of the trailing arms, i.e. rear with respect to the direction of driving. In the case of a swinging axle axis the trailing arms are welded together at their front end via a crossmember of the axle or a swinging axle of spring steel. In the case of the swinging axle link axis the trailing arms are welded together at about their middle via a swinging axle link of torsionally weak U-shaped steel section. In the torsion link axis the trailing arms are joined together at their rear end via a torsion link.

Keeping the unsprung mass as small as possible has been a requirement, reducing the weight of the whole vehicle has now become an issue. A further requirement is to reduce the number of different construction elements in the vehicle and to increase the number of the same elements.

SUMMARY OF THE INVENTION

The object of the present invention is to take these requirements into account and to propose a wheel suspension which is light, satisfies a wide variety of requirements using a large number of the same parts and may be prefabricated in a modular manner.

That objective is achieved by way of the invention in that the trailing arms are single or multi-chamber hollow sections featuring an extrusion projection facing the middle of the vehicle.

The trailing arms of the wheel suspension according to the invention are preferably parts of a swinging axle axis or a torsion link axis or a swinging axle link axis.

The trailing arms of the wheel suspension according to the invention are e.g. extruded sections of light weight metal with the grain structure running in the longitudinal direction of the trailing arm.

The trailing arms feature an extrusion projection facing the middle of the vehicle. The extrusion projection is e.g. a channel-shaped or C-shaped section.

In its simplest form the trailing arm is a single chamber hollow section of polygonal, usefully rectangular or quadratic cross-section. The extrusion projection is in the form of top and bottom strips projecting from the inner wall of the trailing arm. The top and/or bottom strips may project out at an angle; in the case in which the top and bottom strips project out at an angle, a C-shaped extrusion projection is formed on the single or multi-chamber hollow section.

Correspondingly, instead of the single chamber hollow section it is possible to have a multi-chamber e.g. two, three, four or more chamber hollow section.

First attachment means for attaching the springs and/or shock absorbers and/or stabilizers etc. may be provided on the extrusion projection. Such attachment means are e.g. castings and, preferably, lengths of an extruded section. The attachment means exhibit e.g. a mean for mutual attachment to the trailing arm and further means for attaching the suspension and spring elements e.g. a spring, a quill-gear of a shock absorber leg, a shock absorber, a stabilizers, a transverse bar, a transverse stabilizer bar etc. The means for attachment may be designed such that two or more suspension and spring elements, such as e.g. a spring and a shock absorber or a spring, a shock absorber and a transverse stabilizer may be mounted on an attachment means. It is also possible for two or more first attachment means to be provided on a trailing arm and a suspension or spring element to be mounted on each attachment means.

The first attachment means may e.g. fit to the channel-shaped section of the trailing arm by virtue of shape. The attachment means may be secured to the trailing arm by adhesive bonding, screwing, riveting, clamping or by a combination of these methods. Screw-type connections are preferred.

Also these two attachment means may be castings or extruded sections of light weight metal, usefully aluminum, aluminum alloys, magnesium or magnesium alloys.

BRIEF DESCRIPTION OF THE DRAWINGS

FIG. 2 is a plan view of the second attachment means;

FIG. 3 is a plan view of the first attachment means;

FIG. 4 is a cross-section through a trailing arm; and

FIG. 5 is a cross-section through the crossmember of the axle.

DETAILED DESCRIPTION OF PREFERRED EMBODIMENTS

Figure 1:
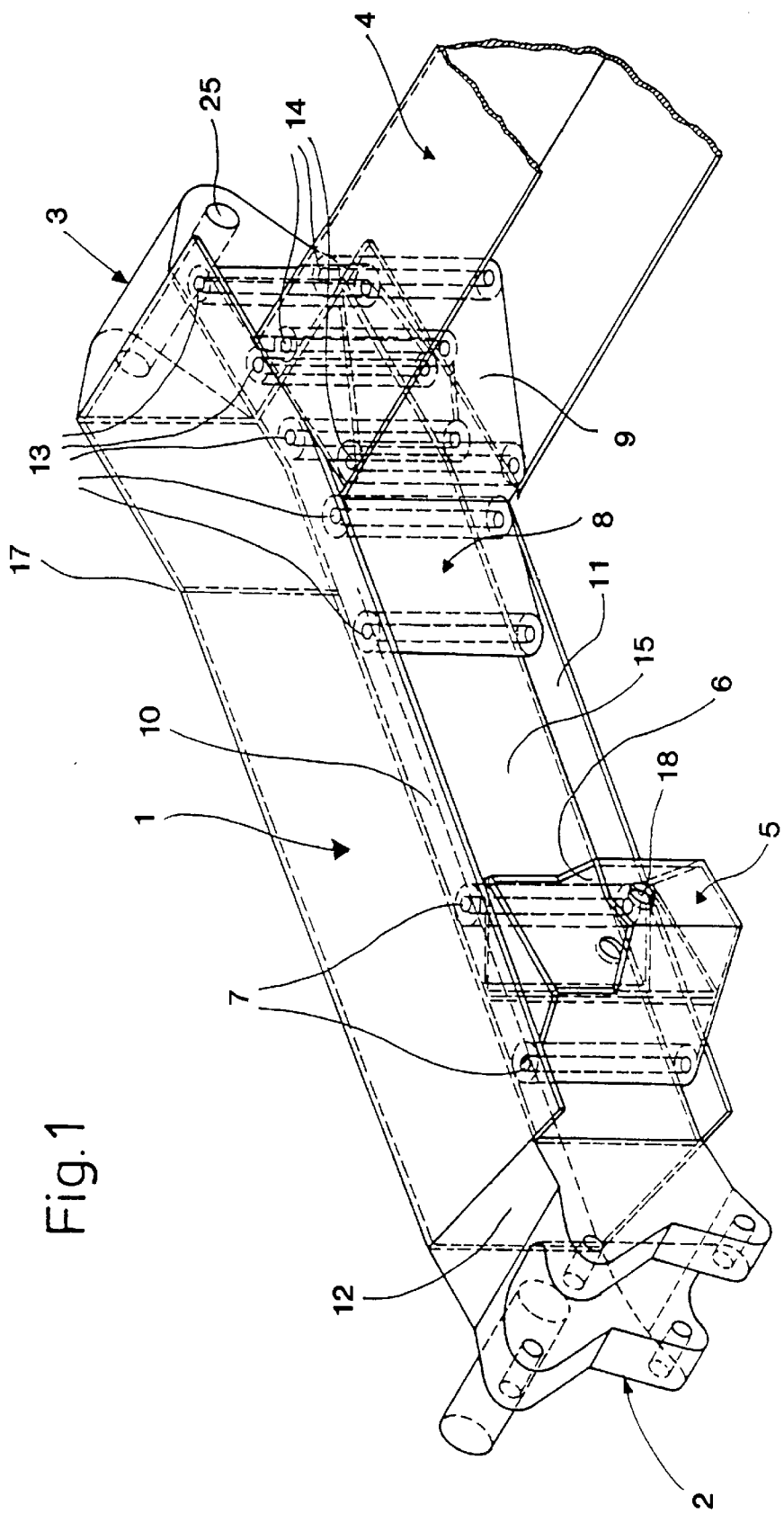
FIG. 1 is a perspective view of the trailing arm of the swinging axle axis.

FIGS. 1 to 5 illustrate the present invention in greater detail using a swinging axle axis as an example. FIG. 1 shows the left part of a swinging axle axis. The swinging axle axis features a trailing arm 1 which has an attachment part 3 at the front end, with respect to the direction of driving. The attachment part 3 may e.g. be a forging, a casting or possibly an extruded section which is attached to the front end of the trailing arm 1. The attachment part 3 may feature a projection which can be inserted into at least one of the hollow chambers in the trailing arm 1. The attachment part 3 may be attached to the trailing arm 1 for example by adhesive bonding, welding, screwing, clamping, or a combination of such attachment possibilities. As a rule the attachment part 3 is penetrated by at least one opening 20. The connection to the vehicle body may be made at that place by means of a bolt or screw-type connection.

At the rear end of the trailing arm 1 a shaped part may be attached as wheel attachment means 2 and for attaching the brakes. The shaped part for the wheel attachment means 2 may again be a cast or forged part, or in some cases may be a length of extruded section. The shaped part for the wheel attachment means 2 may exhibit a projection which may be inserted and fitted in by virtue of its shape in at least one of the hollow parts, in the present case in the single hollow chamber 12, of the trailing arm 1. The wheel attachment means 2 may be attached to the trailing arm by adhesive bonding, bolting, riveting or clamping or by a combination of these joining means.

On the side facing the middle of the vehicle the trailing arm 1 features a projection in the form of a channel-shaped section. The projection is formed by the inner wall strip 15, the top strip 10 and the bottom strip 11. A first means of attachment 5 may e.g. be pushed into this channel-shaped section. The height of the attachment means 5 corresponds to the clear distance between the top strip 10 and the bottom strip 11. In the present case the first attachment means 5 is an extruded section, in particular a hollow multi-chamber section. Two of the chambers are in the form of cylindrical openings 7. Instead of cylindrical openings 7 it would also be possible to provide two bored holes. Corresponding openings may be provided in the top strip 10 and bottom strip 11 and treaded bolts passed through the openings 7 and the holes in the top strip 10 and bottom strip 11. The first attachment means 5 also features a hollow chamber 6 which faces the center of the vehicle and is penetrated at about the middle by a hole. By inserting e.g. a bolt or screw and securing this by a nut or the likes it is possible to attach at that place a wheel suspension component such a shock absorber, a spring leg, spring housing, stabilizer etc. It is also possible to attach two or more wheel suspension components by means of a further opening and a further bolt or on the same bolt.

Instead of only one attachment means 5, it is also possible to provide two or more identical or similar attachment means 5, whereby a first wheel suspension component such as e.g. the spring leg is attached at one attachment means and a second wheel suspension component such as e.g. the shock absorber is attached at the second attachment means.

The crossmember of the axle or swinging axle 4 is attached by means of a second attachment means 8 at the front end of the trailing arm 1, ie. front end with respect to the direction of driving. The second attachment means 8 may again be e.g. an extruded section with a plurality of hollow chambers, whereby some of the chambers 13, 14 are cylindrical in shape. Chambers 13,14 may also be holes. The second attachment means 8 may be attached to the trailing arm 1 e.g. by means of screws or bolts. The attachment means advantageously features a projection 9 for the crossmember of the axle 4. The projection 9 may e.g. be fitted by virtue of its shape into the crossmember of the axle 4 or at least the height of the attachment means 8 corresponds to the clear space between the bottom and top strips of the crossmember of the axle 4. The crossmember of the axle 4 may be attached to the projecting piece by means of screws or bolts and the openings that corresponding to chambers in the projection 9. Instead of screws or bolts it is also possible to make the joint by completely or partially bonding or welding the parts together, or by using a combination of attachment means. Screw-type connections are preferred.

In order to situate the rear end of the trailing arm 1 as close as possible to the middle of the wheel and to keep the bracket of the wheel support as small as possible, it may be useful for the trailing arm 1 to be kinked, offset, angled or bent. In another version the wheel attachment 2 and/or the attachment part 3 may be attached to the trailing arm 1 in such a manner that the trailing arm 1, with reference to the longitudinal axis of the vehicle, runs inclined outwards from the attachment part 3 to the wheel attachment means 2. In FIG. 1 by way of example the trailing arm 1 which in the region of its front end runs parallel to the longitudinal axis and in this section the attachment part 3 is attached to it and is inclined or offset a distance 17 from the front end. The trailing arm 1 runs, with respect to the longitudinal axis of the vehicle, inclined outwards and the wheel attachment means 2 is arranged at the rear end of the trailing arm 1 e.g. by means of an offset such that a wheel axle on the wheel, attachment means 2 is at the desired angle to the longitudinal axis of the vehicle.

From FIG. 1 it can be seen that the attachment means and 8 may be arranged advantageously at almost any place on the trailing arm 1. As a result it is also possible, for example by arranging a swinging axle link at the middle of the trailing arm, to create a swinging axle link axis, or by arranging a torsion link at the rear end of the trailing arm to create a torsion link axis. The attachment means 5 may likewise be arranged at any free point on the trailing arm and, in accordance with the requirements for suspension and shock absorption, the connecting point of the spring action and shock absorption may be placed in the best possible location.

FIG. 2 shows a plan view of the second attachment means 8, in the present case for attaching the crossmember of the axle or swinging axle 4 to the trailing arm 1. This may e.g. be a cast or forged part or it may be a length of extruded section. The attachment means is penetrated by a plurality of openings 13 which accommodate the bolts or screws which join the attachment means 8 to the trailing arm 1. Openings or holes are provided in the top strip 10 and bottom strip 11, aligned with openings 13, and screws or bolts pass through the openings in the top strip 10, the openings 13 and bottom strip 11 in order to secure the attachment means 8 to the trailing arm 1. The projecting piece 9 features openings 14. The projecting piece 9 is pushed into the hollow space in the crossmember of the axle 4 and fixed by screws or bolts which pass through the openings 14 and top and bottom strips of the crossmember of the axle 4.

FIG. 3 shows the plan view of the first attachment means 5 for attaching suspension and spring elements. It is, by way of example, an extruded section with a plurality of chambers—chambers 7 being e.g. openings to accommodate bolts or screws. Chambers 6 may each exhibit an opening 18 on two facing sidewalls. Advantageously these openings lie on a horizontal axis, pass through the two parallel walls and have a bolt or screw passing through them. For example a spring leg or spring housing or a shock absorber etc. may be attached to this screw or bolt.

FIG. 4 shows a cross-section through a trailing arm 1 in a simple version comprising a hollow single-chamber section. The chamber 12 is delimited on one side by the wall strip 15. The top strip 10, the wall strip 15 and the bottom strip 11 form a channel-shaped section. Usefully, the channel-shaped section 10, 11, 15 faces the middle of the vehicle. In some cases the top strip 10 or the bottom strip 11 or both the top strip 10 and the bottom strip 11 may feature an angled edge. As a result, at least in that case, a C-shaped connection is formed. In order to be able to make use of a C-shaped connection, the means of attachment 5, 8 usefully require to have grooves machined into them viz., in order that the attachment means 5, 8 may be pushed into the channel-shaped section.

FIG. 5 shows by way of example a cross-section through the crossmember of the axle 4, which forms a section of polygonal cross-section that, as viewed in the direction of driving, is open towards the rear. Advantageously, the clear distance between the two flanges corresponds exactly to the height of the projecting piece 9 of the attachment means 8.

Instead of the crossmember of the axle 4 in form of an open section, depending on the design of the axle, the section may be U-shaped, V-shaped, or with appropriate attachment means 9, tube-shaped. In some cases, in order to increase the torsion capacity, the crossmember of the axle 4 may also exhibit slits, twists, edges, dents and/or elevations etc.

The crossmember of the axle 4, as with the trailing arm 1, may be an extruded section of light weight metal such as aluminum and its alloys or magnesium and its alloys. In the case of the extruded crossmember of the axles, the extrusion grain structure may run in the longitudinal direction of the crossmember of the axle. In another version the crossmember of the axle may e.g. also be made of formed sheet, in particular aluminum sheet, or of fiber-reinforced plastic, such as plastic reinforced by glass or carbon fibers.

Preferred for the structural elements described above are aluminum alloys of the AlMgSi AlMg, AlMgMn or AlZnMg type. For the individual parts of a wheel suspension of the kind described it is possible in each case to use the same or different aluminum alloys.

The length of the trailing arm and the length of the torsion link, swinging axle link or swinging axle may be selected according to the design of the vehicle. Consequently, the attachment means may remain the same, enabling a variety of axle types to be made with a small number of individual parts. It is possible therefore to cut the trailing arm from an endless extruded section to the length required of the vehicle concerned. The same is true for the crossmember of the axle. According to the torsional rigidity required, a multi-chamber trailing arm may be used instead of a single chamber trailing arm. In the case of torsion links, swinging axle links or swinging axles, the torsional stability may be influenced by the shape, material or thickness of material. If the attachment means for the suspension and spring components or the attachment means for the crossmember of the axles are in the form of extruded sections, then these may be cut off to a length corresponding to the clear distance between the top and bottom strips. The result is an efficient way of producing a variety of axles of different design. Because of the simple design and ease of exchanging parts of the wheel suspension, it is possible to repair damage in a simple and inexpensive manner e.g. after accidents.

The parts of the wheel suspension, in particular those in the form of extruded sections, may be employed without further treatment, in particular without any surface treatment. Depending on the requirements, however, it is also possible to anodize and/or coat or plate the parts made of aluminum alloys.

I claim:

1. Wheel suspension for road vehicles having at least one axle, which comprises: a crossmember; a trailing arm attached at both ends of the crossmember; wherein said trailing arm includes means for attaching said trailing arm to the vehicle and means for mounting a wheel; and wherein said trailing arm is a single or multi-chamber hollow extruded section with an extrusion projection in the form of a channel-shaped section or a C-shaped section facing the middle of the vehicle, thereby allowing attachment of said crossmember to the trailing arm at various lengthwise positions.

2. Wheel suspension according to claim 1, wherein said trailing arm is one of a swinging axle, a swinging axle link, and a torsion link.

3. Wheel suspension means according to claim 1, wherein said trailing arm is an extruded section with grain structure running in the longitudinal direction of the trailing arm and made of light weight metal.

4. Wheel suspension according to claim 3, wherein said light weight metal is selected from the group consisting of aluminum, an aluminum alloy, magnesium and a magnesium alloy.

5. Wheel suspension according to claim 1, including a first attachment means for spring and suspension elements.

6. Wheel suspension according to claim 5, wherein said first attachment means is for at least one of springs, shock absorbers and stabilizers.

7. Wheel suspension according to claim 5, including a second attachment means mounted on the extrusion projection.

8. Wheel suspension according to claim 6, including a second attachment means mounted on the extrusion projection.

9. Wheel suspension according to claim 5, wherein said first attachment means is at least one of castings and extruded sections of light weight metal.

10. Wheel suspension according to claim 7, wherein said first and second attachment means is at least one of castings and extruded sections of light weight metal.

11. Wheel suspension according to claim 1, wherein the crossmember is an extruded section of light weight metal.

12. Wheel suspension according to claim 1, for non-power driven, semi-rigid axles.

13. Wheel suspension according to claim 1, wherein said crossmember is a crossmember of the axle.

14. Wheel suspension according to claim 1, wherein said crossmember is an axle carrier.

15. Wheel suspension according to claim 1, wherein said crossmember is a swinging axle link.

16. Wheel suspension according to claim 1, wherein said crossmember can be attached to said extrusion projection to create a torsion link.

17. Wheel suspension according to claim 1, wherein said crossmember can be attached to said extrusion projection to create a swinging axle link.

* * * * *